United States Patent [19]

Okubo et al.

[11] Patent Number: 4,969,369
[45] Date of Patent: Nov. 13, 1990

[54] MULTI-STAGE GEAR SHIFT TRANSMISSION

[75] Inventors: Kiyokazu Okubo; Shizuo Ishikura; Hiroshi Takagishi; Kazumasa Shibuya; Makoto Sumi, all of Saitama, Japan

[73] Assignee: Honda Giken Kogyo Kabushyiki Kaisha, Tokyo, Japan

[21] Appl. No.: 427,391

[22] Filed: Oct. 27, 1989

[30] Foreign Application Priority Data

Oct. 28, 1988 [JP] Japan .................. 63-272408

[51] Int. Cl.$^5$ .............. B60K 41/26; F16H 57/10; F16D 23/06
[52] U.S. Cl. ............... 74/411.5; 192/4 C; 192/53 F
[58] Field of Search ............. 74/411.5; 192/4 A, 4 C, 192/53 F

[56] References Cited

U.S. PATENT DOCUMENTS

| | | | |
|---|---|---|---|
| 4,225,024 | 9/1980 | Kuzma | 74/411.5 X |
| 4,257,284 | 3/1981 | Ashauer et al. | 74/411.5 X |
| 4,294,338 | 10/1981 | Simmons | 74/411.5 X |
| 4,503,957 | 3/1985 | Ikemoto et al. | 192/4 C |
| 4,527,442 | 7/1985 | Hoffmann et al. | 74/411.5 |
| 4,598,599 | 7/1986 | Ikemoto | 74/411.5 |
| 4,889,003 | 12/1989 | Rietsch | 192/53 F X |

*Primary Examiner*—Allan D. Herrmann
*Attorney, Agent, or Firm*—Armstrong, Nikaido, Marmelstein, Kubovcik & Murray

[57] ABSTRACT

A multi-stage gear shift transmission comprising a plurality of forward stage gear trains capable of being alternatively established, and a reverse stage gear train having an idle gear portion meshed with a reverse input gear and a reverse output gear. The forward stage and reverse stage gear trains are provided between an input shaft and an output shaft parallel to the inut shaft. A reverse stage establishing clutch mechanism is interposed in the middle of the reverse stage gear train. The idle gear portion is divided into a first idle gear meshed with the reverse input gear, and a second idle gear meshed with the reverse output gear and capable of being connected to the first idle gear through the reverse stage establishing clutch mechanism. The reverse stage establishing clutch mechanism comprises a sleeve which is engaged with the first idle gear for relative non-rotation and for axial relative movement and which is capable of being meshed with the second idle gear, a braking member which is disposed between the first and second idle gears for axial movement so that it may be urged toward the second idle gear in response to the movement of the sleeve toward the second idle gear and which is capable of being rotated in unison with the first idle gear, and a stationary part fixedly disposed to temporarily frictionally engage with the braking member when the braking member is moved toward the second idle gear.

3 Claims, 3 Drawing Sheets

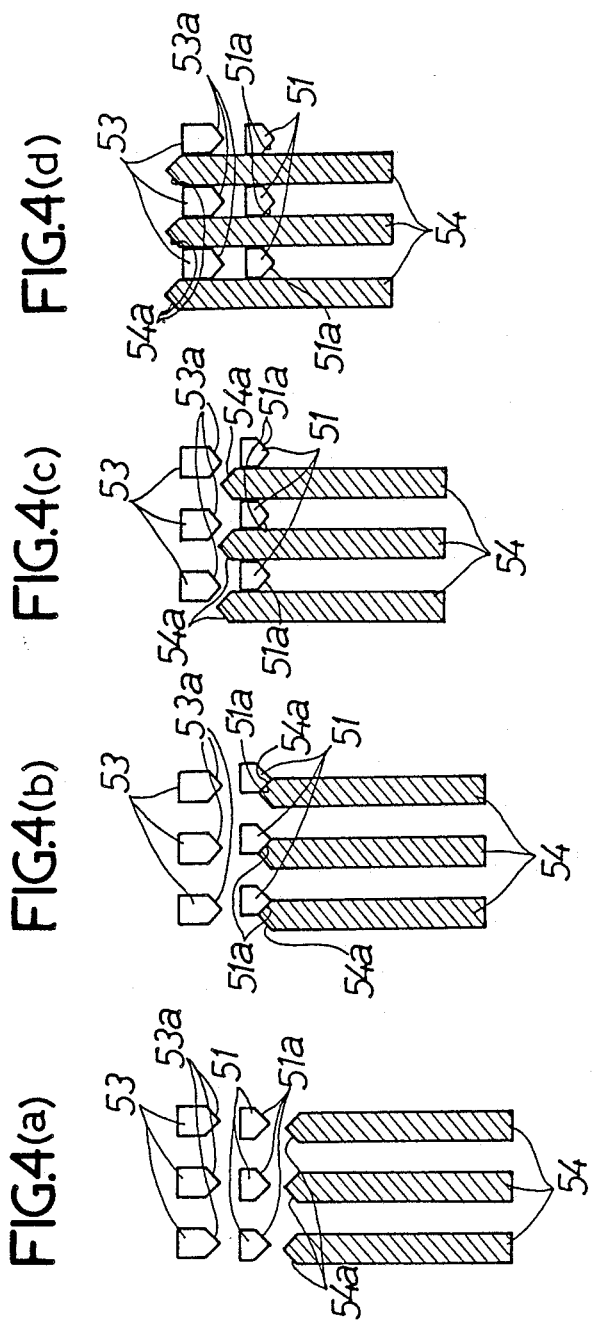

MULTI-STAGE GEAR SHIFT TRANSMISSION

BACKGROUND OF THE INVENTION

The present invention relates to a multi-stage gear shift transmission and, more particularly, to such a transmission including a plurality of forward shift stage gear trains capable of being alternatively established, and a reverse stage gear train having an idle gear portion meshed with a reverse input gear and a reverse output gear, the forward shift stage and reverse stage gear trains being provided between an input-side shaft and an output-side shaft parallel to the input-side shaft, and a reverse stage establishing clutch mechanism interposed in the middle of the reverse stage gear train.

Such transmissions are conventionally known, for example from Japanese Utility Model Application Laid-open No. 156652/87.

In the above conventional gear shift transmission, the selective establishment of the forward shift stage is conducted by the connecting operation of the forward shift stage establishing clutch mechanism, and the establishment of the reverse stage is conducted by the connecting operation of the reverse stage establishing clutch mechanism interposed between the input shaft and the reverse input gear. Moreover, the reverse stage establishing clutch mechanism generally comprises a cone portion provided in a clutch gear coupled to the reverse input gear for relative non-rotation, a ring having a tapered surface capable of frictionally engaging the cone portion, and a sleeve coupled to the input shaft and capable of being meshed with the clutch gear, so that when the reverse stage is established, the ring is urged toward the clutch gear by the sleeve to prevent the generation of gearing chatter. In such prior art, during establishment of forward stage, there is a very large relative difference in rotation speed produced between the cone portion and the tapered surface of the ring which are reversely rotating with respect to each other at a slightly spaced apart distance, and it is necessary to provide a design meeting such large difference in relative rotation speed.

The present invention has been accomplished with such circumstances in view, and it is an object of the present invention to provide a multi-stage gear shift transmission in which when the reverse stage is established, gearing chatter is prevented from being generated and no large relative difference in rotation speed is produced in the frictional engaging portions of the reverse stage establishing clutch mechanism.

SUMMARY OF THE INVENTION

A first feature of the present invention resides in a multi-stage gear shift transmission comprising a plurality of forward shift stage gear trains capable of being alternatively established, and a reverse stage gear train having an idle gear portion meshed with a reverse input gear and a reverse output gear, the forward stage and reverse stage gear trains being provided between an input shaft and an output shaft parallel to the input shaft, and a reverse stage establishing clutch mechanism interposed in the middle of the reverse stage gear train, wherein the idle gear portion is divided into a first idle gear meshed with the reverse input gear, and a second idle gear meshed with the reverse output gear and capable of being connected to the first idle gear through the reverse stage establishing clutch mechanism. The reverse stage establishing clutch mechanism comprises a sleeve which is engaged with the first idle gear for relative non-rotation and for axial relative movement and which is capable of being meshed with the second idle gear, a braking member which is disposed between the first and second idle gears for axial movement so that it may be urged toward the second idle gear in response to the movement of the sleeve toward the second idle gear and which is capable of begin rotated in unison with the first idle gear, and a stationary part fixedly disposed to temporarily frictionally engage the braking member when the braking member is moved toward the second idle gear.

In addition, in a second feature of the present invention, the first and second idle gears are rotatably carried on an idle gear shaft fixed to a transmission case in parallel to the input shaft and the output shaft, and the stationary part is integrally provided on the idle gear shaft.

Further, in a third feature of the present invention, the idle gear shaft has an eccentric shaft portion provided on one end thereof to project therefrom, and the transmission case includes a fitting recess provided in one end wall thereof for permitting the fitting of one end of the idle gear shaft therein, a fitting hole eccentrically provided in a closed end of the fitting recess for permitting the fitting of the shaft portion therein, and a fitting recess provided in the other end wall thereof in an opposed relation to the fitting recess for permitting the fitting of the other end of the idle gear shaft therein.

According to the above first feature, it is possible to establish the reverse stage gear train while preventing the generation of gearing chatter by providing the connecting operation of the reverse stage establishing clutch mechanism to connect the first and second idle gears. Moreover, during establishment of the forward gear shift stage, the braking member is in rotation, but the stationary part is in a resting state, and a large relative difference in rotation speed cannot be produced between the braking member and the stationary part.

According to the second feature, the stationary part is mounted on the idle gear shaft carrying the first and second idle gears and therefore, the structure of disposition of the stationary part is simplified.

Further, according to the third feature, it is possible to extremely easily fix the idle gear shaft to the transmission case.

BRIEF DESCRIPTION OF THE DRAWINGS

The above and other objects and the attendant advantages of the present invention will become readily apparent by reference to the following detailed description when considered in conjunction with accompanying drawings wherein:

FIGS. 4(*a*), 4(*b*), 4(*c*) and 4(*d*) are sectional views taken along line IV—IV in FIG. 2, illustrating the operation of a reverse stage establishing clutch mechanism in sequence.

DETAILED DESCRIPTION OF A PREFERRED EMBODIMENT

Figure 1:
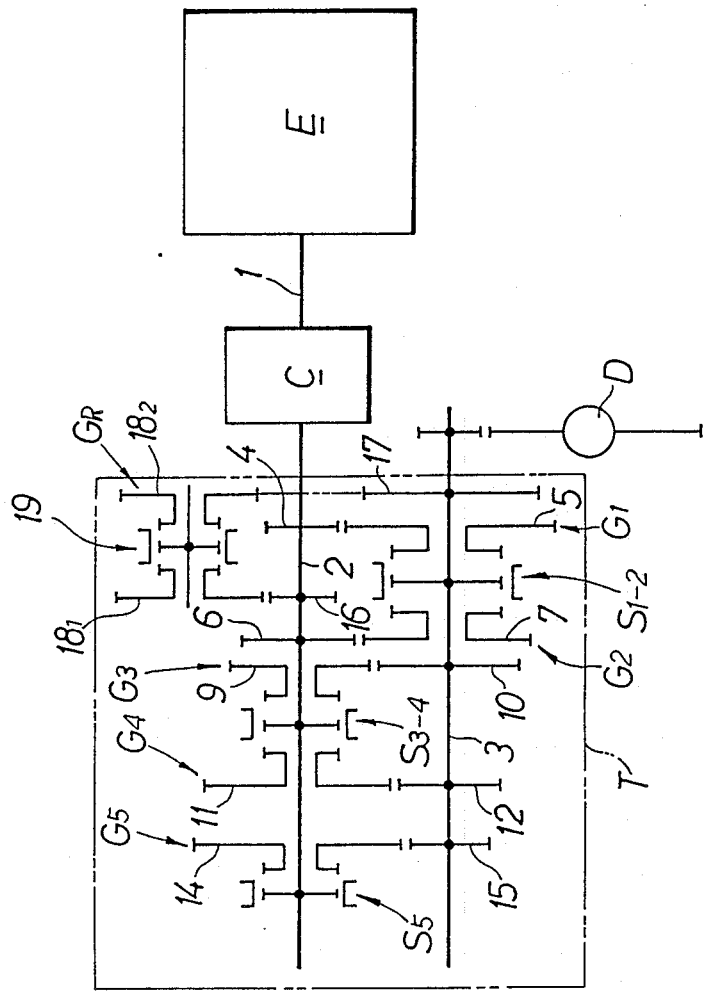
FIG. 1 is a schematic diagram illustrating a driving system for a vehicle.

The present invention will now be described with reference to the accompanying drawings by way of one embodiment in which the present invention is applied to a multi-stage gear shift transmission having five forward stages and one reverse stage. Referring first to FIG. 1, driving power from an engine E is transmitted through a clutch C and a multi-stage gear shift transmission T to a differential D and further to a driving wheel (not shown). The multi-stage gear shift transmission T comprises a plurality of forward stage gear trains, e.g., a first stage gear train G1, a second stage gear train G2, a third stage gear train G3, a fourth stage gear train G4 and a fifth stage gear train G5, and a reverse stage gear train $G_R$, which are provided between a main shaft 2 as an input shaft disposed coaxially with a crank shaft 1 of the engine E and rotatably carried in a transmission case 20 (see FIG. 2) and a counter shaft 3 as an output shaft rotatably carried in the transmission case 20 in parallel to the main shaft 2.

The first stage gear train G1 is comprised of a driving gear 4 fixedly mounted on the main shaft 2, and a driven gear 5 meshed with the driving gear 4 and relatively rotatably carried on the counter shaft 3. The second stage gear train G2 is comprised of a driving gear 6 fixedly mounted on the main shaft 2, and a driven gear 7 meshed with the driving gear 6 and relatively rotatably carried on the counter shaft 3. A first and second synchronous shift meshing mechanism $S_{1-2}$ as a forward stage establishing clutch mechanism is mounted on the counter shaft 3 for allowing the driven gears 5 and 7 of the first and second shift gear trains G1 and G2 to alternatively engage the counter shaft 3. The third stage gear train G3 is comprised of a driving gear 9 relatively rotatably carried on the main shaft 2, and a driven gear 10 meshed with the driving gear 9 and fixedly mounted on the counter shaft 3. The fourth stage gear train G4 is comprised of a driving gear 11 relatively rotatably carried on the main shaft 2, and a driven gear 12 meshed with the driving gear 11 and fixedly mounted on the counter shaft 3. A conventionally well-known third and fourth synchronous shift meshing mechanism $S_{3-4}$ is mounted on the main shaft 2 for allowing the driving gears 9 and 11 of the third and fourth stage gear trains G3 and G4 to alternatively engage the main shaft 2. The fifth stage gear train G5 is comprised of a driving gear 14 relatively rotatably carried on the main shaft 2, and a driven gear 15 meshed with the driving gear 14 and fixedly mounted on the counter shaft 3. A fifth synchronous shift meshing mechanism $S_5$ is mounted on the main shaft 2 for allowing the main shaft 2 to engage the driving gear 14.

Figure 2:
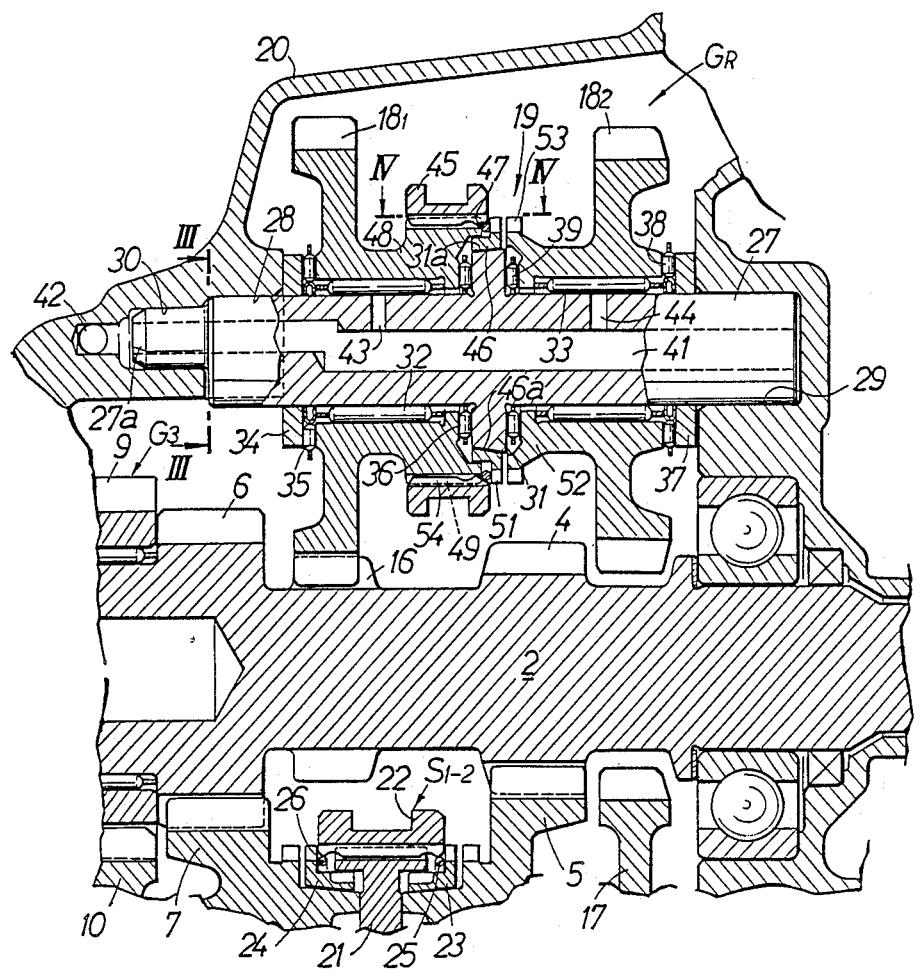
FIG. 2 is a longitudinal sectional view of an essential portion of a transmission according to the present invention.

Referring to FIG. 2, the reverse stage gear train $G_R$ is comprised of a reverse input gear 16 fixedly mounted on the main shaft 2, a reverse output gear 17 fixedly mounted on the counter shaft 3, a first idle gear $18_1$ normally meshed with the reverse input gear 16, a second idle gear $18_2$ normally meshed with the reverse output gear 17, and a reverse stage establishing clutch mechanism 19 disposed between the first and second idle gears $18_1$ and $18_2$.

The first and second synchronous shift meshing mechanism $S_{1-2}$ is a well known one which comprises a sleeve 22 slidably spline-connected to a hub 21 mounted on the counter shaft 3, blocking rings 23 and 24 axially movably disposed between the sleeve 22 and the driven gear 5 and between the sleeve 22 and the driven gear 7, respectively, and synchronizing springs 25 and 26 surrounding the blocking rings 23 and 24, respectively. The reverse input gear 16 is integrally provided on the main shaft at a location corresponding to the first and second synchronous shift meshing mechanism $S_{1-2}$, and the reverse output gear 17 is integrally provided on the counter shaft 3 between the driven gear 5 of the first stage gear train G1 and the transmission case 20.

Figure 3:
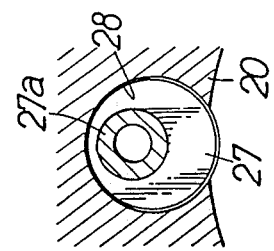
FIG. 3 is a sectional view taken along a line III—III in FIG. 2.

Referring to FIG. 2 and FIG. 3, an idle gear shaft 27 parallel to the main shaft 2 and the counter shaft 3 is fixed to the transmission case 20. Specifically, the idle gear shaft 27 is basically columnarly formed and has its one end fitted in a fitting recess 28 provided in one end wall (left end wall as viewed in FIG. 2) of the transmission case 20 and the other end fitted in a fitting recess 29 provided in the other end wall (right end wall as viewed in FIG. 2) of the transmission case 20 in an opposed relation to the fitting recess 28. Moreover, the idle gear shaft 27 has a smaller diameter shaft portion 27a provided on one end thereof at a place eccentric from its center to project therefrom. A fitting hole 30 is eccentrically provided in a closed end of the fitting recess 28 for permitting the fitting of the shaft portion 27a therein. Thus, the idle gear shaft 27 is fixed to the transmission case 20 by fitting the opposite ends of the idle gear shaft 27 into the fitting recesses 28 and 29 in the transmission case 20 in such a manner that the shaft portion 27a is fitted into the fitting hole 30.

At its axially middle portion, the idle gear shaft 27 is integrally provided with a radially outwardly projecting collar-like hub 31. The first idle gear $18_1$ is relatively rotatably carried on the idle gear shaft 27 between the hub 31 and the one end wall of the transmission case 20, and the second idle gear $18_2$ is relatively rotatably carried between the hub 31 and the other end wall of the transmission case 20. More specifically, a radial bearing 32 is interposed between the first idle gear $18_1$ and the idle gear shaft 27, and a radial bearing 33 is interposed between the second idle gear $18_2$ and the idle gear shaft 27. In addition, thrust bearings 35 and 36 are interposed between a disk-like support plate 34 abutting against the one end wall of the transmission case 20 as well as the hub 31 and the first idle gear $18_1$, respectively. Thrust bearings 38 and 39 are interposed between a disk-like support plate 37 abutting against the other end wall of the transmission case 20 as well as the hub 31 and the second idle gear $18_2$, respectively.

The idle gear shaft 27 has a lubricating oil supply passage 41 made therein, and the transmission case 20 has a passage 42 made therein and communicating with the supply passage 41. Moreover, supply holes 43 and 44 are made in a side of the idle gear shaft 27 at places corresponding to the radial bearings 32 and 33 to lead to the lubricating oil supply passage 41.

The reverse stage establishing clutch mechanism 19 is comprised of a sleeve 45 engaged with the first idle gear $18_1$ for relative non-rotation and for axial relative movement and capable of being meshed with the second idle gear $18_2$, a blocking ring 46 as a braking member which is disposed between the first and second idle gears $18_1$ and $18_2$ for axial movement so that it may be urged toward the second idle gear $18_2$ in response to the movement of the sleeve 45 toward the second idle gear $18_2$ and which is rotatable in unison with the first idle gear $18_1$, a synchronizing spring 47 surrounding the blocking ring 46, and the hub 31 as a stationary part mounted on the stationary idle gear shaft 27 to temporarily frictionally engage the blocking ring 46 when the blocking ring 46 is moved toward the second idle gear 18$_2$. Tapered surfaces 46a and 31a capable of coming into slide contact with each other are provided around an inner periphery of the blocking ring 46 and around an outer periphery of the hub 31, respectively.

The first idle gear 18$_1$ is integrally provided with a cylindrical portion 48 extending toward the second idle gear 18$_2$, and spline teeth 49 are provided around an outer periphery of the cylindrical portion 48. Spline teeth 51 corresponding to the spline teeth 49 are provided around an outer periphery of the blocking ring 46. Further, the second idle gear 18$_2$ is provided with a cylindrical portion 52 extending toward the first idle gear 18$_1$, and spline teeth 53 corresponding to the spline teeth 49 and 51 are provided around an outer periphery of the cylindrical portion 52. Spline teeth 54 are provided around an inner periphery of the sleeve 45 and meshed with the spline teeth 49. The spline teeth 54 are capable of being also meshed with the splines 51 and 53.

Referring to FIG. 4, a triangular chamfered portion 54a is formed at a leading end of each of the spline teeth 54 of the sleeve 45 closer to the blocking ring 46. Triangular chamfered portions 51a and 53a corresponding to the chamfered portions 54a are formed at those leading ends of each of the spline teeth 51 of the blocking ring 46 and the spline teeth 53 of the second idle gear 18$_2$ which are closer to the sleeve 45.

The operation of this embodiment will be described below. During shifting from a neutral state to the reverse stage, the sleeve 45 of the reverse stage establishing clutch mechanism 19 is driven rightwardly from a neutral state (a state shown in FIG. 4a) shown in FIG. 2 by a shift fork (not shown). The movement of the sleeve 45 causes the blocking ring 46 to be urged toward the second idle gear 18$_2$ by the spline teeth 54 through the synchronizing spring 47, so that the tapered surface 46a of the blocking ring is urged against the tapered surface 31a of the hub 31.

When the movement of the sleeve 45 causes the chamfered portions 54a of the spline teeth 54 to abut against the chamfered portions 51a of the spline teeth 51, a strong frictional engaging force is generated between both the tapered portions 46a and 31a. Thus, even if the main shaft 2 is being rotated under the action of an inertial force, a braking force due to such frictional engaging force acts, so that the rotation of the first idle gear 18$_1$ and thus the main shaft 2 is stopped.

Thereafter, the sleeve 45 is further moved rightwardly, so that the spline teeth 54 are engaged with the spline teeth 53 of the second idle gear 18$_2$ which is a resting state as shown in FIG. 4d, passing through a state shown in FIG. 4c. In this case, an urging force for urging the tapered surface of the blocking ring 46 against the tapered surface 31a does not act on the blocking ring 46 and hence, the blocking ring 46 is free to rotate. This causes the first and second idle gears 18$_1$ and 18$_2$ to be free to rotate about the idle gear shaft 27 while being connected to each other, establishing the reverse stage gear train G$_R$.

It should be noted that during forward travelling, the sleeve 45 has been returned to a neutral position shown in FIG. 2 and in this state, the blocking ring 46 is in rotation but the hub 31 is in a resting state. Therefore, even if the main shaft 2 is being rotated at a higher speed, a large difference in rotation cannot be produced between the opposed tapered surfaces 46a and 31a.

In addition, the idle gear portion disposed on the idle gear shaft parallel to the main shaft 2 is divided into the first and second idle gears 18$_1$ and 18$_2$; the reverse stage establishing mechanism 19 is interposed between the idle gears 18$_1$ and 18$_2$, and further, the reverse input gear 16 is fixedly mounted on the main shaft 2 at the location corresponding to the first and second synchronous shift meshing mechanism S$_{1-2}$ interposed between the first gear train G1 and the second gear train G2. Therefore, an empty space produced by provision of the first and second synchronous shift meshing mechanism S$_{1-2}$ can be effectively used to dispose the reverse stage establishing clutch mechanism 19, leading to a reduced length of the transmission T along an axis of the main shaft 2, as compared with the prior art transmission in which the reverse stage establishing clutch mechanism is disposed on the main shaft 2 or the counter shaft 3.

Further, in the reverse stage establishing clutch mechanism 19, the hub 31 is integrally provided on the idle gear shaft 27 as a stationary part capable of frictionally engaging the blocking ring 46 and therefore, the structure of disposition of the stationary part is extremely simplified. In addition, the idle gear shaft 27 is capable of being fixed to the transmission case 20 by an extremely simple structure where the shaft portion 27a eccentrically provided on one end thereof to project therefrom is merely fitted in the fitting hole 30.

As discussed above, according to the first feature of the present invention, the idle gear portion is divided into the first idle gear meshed with the reverse input gear, and the second idle gear meshed with the reverse output gear and capable of being connected to the first idle gear through the reverse stage establishing clutch mechanism, and the reverse stage establishing clutch mechanism comprises the sleeve which is engaged with the first idle gear for relative non-rotation and for axial relative movement and which is capable of being meshed with the second idle gear, the braking member which is disposed between the first and second idle gears for axial movement so that it may be urged toward the second idle gear in response to the movement of the sleeve toward the second idle gear and which is capable of being rotated in unison with the first idle gear, and the stationary part fixedly disposed to temporarily frictionally engage the braking member when the braking member is moved toward the second idle gear. Therefore, during establishment of the reverse stage, the generation of gearing chatter is prevented. On the other hand, during establishment of the forward gear shift stage, a large relative difference in rotation is not produced between the braking member and the stationary part. Accordingly, it is unnecessary to provide a design meeting the very large relative difference in rotation speed between the parts.

According to the second feature of the present invention, the first and second idle gears are rotatably carried on the idle gear shaft fixed to the transmission case in parallel to the input shaft and the output shaft, and the stationary part is integrally provided on the idle gear shaft. Therefore, the structure of disposition of the stationary part is simplified.

According to the third feature of the present invention, the idle gear shaft has the eccentric shaft portion provided on one end thereof to project therefrom, and the transmission case includes the fitting recess provided in one end wall thereof for permitting the fitting of one end of the idle gear shaft therein, the fitting hole eccentrically provided in the closed end of the fitting recess for permitting the fitting of the shaft portion therein, and the fitting recess provided in the other end wall thereof in an opposed relation to the fitting recess for permitting the fitting of the other end of the idle gear shaft therein. Therefore, the structure of fixing of the idle gear shaft to the transmission case is extremely simplified.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A multi-stage gear shift transmission comprising a plurality of forward stage gear trains capable of being alternatively established, and a reverse stage gear train having an idle gear portion meshed with a reverse input gear and a reverse output gear, said forward stage and reverse stage gear trains being provided between an input shaft and an output shaft parallel to said input shaft, and a reverse stage establishing clutch mechanism interposed in the middle of said reverse stage gear train, wherein said idle gear portion is divided into a first idle gear meshed with the reverse input gear, and a second idle gear meshed with the reverse output gear and capable of being connected to said first idle gear through said reverse stage establishing clutch mechanism, and said reverse stage establishing clutch mechanism comprises a sleeve which is engaged with the first idle gear for relative non-rotation and for axial relative movement and which is capable of being meshed with said second idle gear, a braking member which is disposed between said fist and second idle gears for axial movement so that it may be urged toward said second idle gear in response to the movement of said sleeve toward said second idle gear and which is capable of being rotated in unison with said first idle gear, and a stationary part fixedly disposed to temporarily frictionally engage with said braking member when said braking member is moved toward said second idle gear.

2. A multi-stage gear shift transmission according to claim 1, wherein said first and second idle gears are rotatably carried on an idle gear shaft fixed to a transmission case in parallel to the input shaft and the output shaft, and said stationary part is integrally provided on said idle gear shaft.

3. A multi-stage gear shift transmission according to claim 2, wherein said idle gear shaft has an eccentric shaft portion provided on one end thereof projecting therefrom, and said transmission case includes a first fitting recess provided in one end wall thereof having said one end of said idle gear shaft fitted therein, a fitting hole eccentrically provided in a closed end of said first fitting recess having said eccentric shaft portion fitted therein, and a second fitting recess provided in the other end wall thereof in an opposed relation to said first fitting recess having the other end of said idle gear shaft fitted therein.

* * * * *